US011911897B2

(12) United States Patent
Jafari

(10) Patent No.: US 11,911,897 B2
(45) Date of Patent: Feb. 27, 2024

(54) MECHANICALLY OVER-DAMPED ACTUATORS HAVING ADJUSTABLE STIFFNESS

(71) Applicant: Board of Regents, The University of Texas System, Austin, TX (US)

(72) Inventor: Amir Jafari, San Antonio, TX (US)

(73) Assignee: BOARD OF REGENTS, THE UNIVERSITY OF TEXAS SYSTEM, Austin, TX (US)

( * ) Notice: Subject to any disclaimer, the term of this patent is extended or adjusted under 35 U.S.C. 154(b) by 992 days.

(21) Appl. No.: 16/675,201

(22) Filed: Nov. 5, 2019

(65) Prior Publication Data

US 2020/0139538 A1 May 7, 2020

Related U.S. Application Data

(60) Provisional application No. 62/755,754, filed on Nov. 5, 2018.

(51) Int. Cl.
*B25J 9/10* (2006.01)
(52) U.S. Cl.
CPC .................................... *B25J 9/106* (2013.01)
(58) Field of Classification Search
CPC ........ B25J 9/106; B25J 9/1005; B25J 9/1633; B25J 17/0233; F16H 59/0204; F16H 2059/0295
See application file for complete search history.

(56) References Cited

U.S. PATENT DOCUMENTS

| 7,201,074 B2 * | 4/2007 | Ima | F16H 63/38 |
| | | | 74/339 |
| 2018/0172140 A1 * | 6/2018 | Liubakka | B60K 20/02 |

FOREIGN PATENT DOCUMENTS

| CN | 105328711 B  * | 3/2017 | ............... B25J 17/00 |
| CN | 106863348 A  * | 6/2017 | .......... B25J 17/0258 |
| KR | 100484885 B1 * | 4/2004 | ............... B25J 17/00 |
| WO | WO-03025694 A1 * | 3/2003 | .......... F16H 59/0204 |
| WO | WO-2014201374 A1 * | 12/2014 | ............... A61F 2/76 |

OTHER PUBLICATIONS

Schiavi, R.; Grioli, G.; Sen, S.; Bicchi, A. VSA-II: A Novel Prototype of Variable Stiffness Actuator for Safe and Performing Robots Interacting with Humans. In Proceedings of the 2008 IEEE International Conference on Robotics and Automation, Pasadena, CA, USA, May 19-23, 2008.

(Continued)

*Primary Examiner* — Bobby Rushing, Jr.
(74) *Attorney, Agent, or Firm* — Thomas|Horstemeyer, LLP

(57) ABSTRACT

In one embodiment, a mechanically over-damped actuator includes an output link comprising a lever and a torsion spring associated with the lever, wherein the lever has an initial equilibrium position and is pivotable about a pivot axis, wherein the spring opposes pivoting of the lever away from its initial equilibrium position such that the spring tends to return the lever to the equilibrium position.

14 Claims, 7 Drawing Sheets

(56) References Cited

OTHER PUBLICATIONS

Jafari, A.; Vanderborght, B.; Tsagarakis, N.; Cadwell, D. A Novel Actuator with Adjustable Stiffness (AwAS). In Proceedings of the 2010 IEEE/RSJ International Conference on Intelligent Robots and Systems, Taipei, Taiwan, Oct. 18-22, 2010; pp. 4201-4206.
Tsagarakis, N.G.; Sardellitti, I.; Caldwell, D.G. A New Variable Stiffness Actuator (CompAct—VSA): Design and Modelling. In Proceedings of the 2011 IEEE/RSJ International Conference on Intelligent Robots and Systems, San Francisco, CA, USA, Sep. 25-30, 2011.
Ketelaar, J.G.; Visser, L.C.; Stramigioli, S.; Carloni, R. Controller Design for a Bipedal Walking Robot Using Variable Stiffness Actuators. In Proceedings of the 2013 IEEE International Conference on Robotics and Automation, Karlsruhe, Germany, May 6-10, 2013.
Kizilhan, H.; Baser, O.; Kilic, E.; Ulusoy, N. Comparison of Controllable Transmission Ratio Type Variable Stiffness Actuator with Antagonistic and Pre-Tension Type Actuators for the Joints Exoskeleton Robots. In Proceedings of the 2015 12th International Conference on Informatics in Control, Automation and Robotics (ICINCO), Colmar, France, Jul. 21-23, 2015.
Vu, H.Q.; Yu, X.; Iida, F.; Pfeifer, R. Improving Energy Efficiency of Hopping Locomotion by Using a Variable Stiffness Actuator. IEEE/ASME Trans. Mechatron. 2016, 21, 472-486.
Kim, B.S.; Song, J.B. Hybrid Dual Actuator Unit: A Design of a Variable Stiffness Actuator Based on an Adjustable Moment Arm Mechanism. In Proceedings of the 2010 IEEE International Conference on Robotics and Automation, Anchorage, AK, USA, May 3-7, 2010.
Kim, B.S.; Kim, Y.L.; Song, J.B. Preliminary Experiments on Robotic Assembly Using a Hybrid-Type Variable Stiffness Actuator. In Proceedings of the 2011 IEEE/ASME International Conference on Advanced Intelligent Mechatronics (AIM), Budapest, Hungary, Jul. 3-7, 2011.
Berret, B.; Yung, I.; Nori, F. Open-Loop Stochastic Optimal Control of a Passive Noise-Rejection Variable Stiffness Actuator: Application to Unstable Tasks. In Proceedings of the 2013 IEEE/RSJ International Conference on Intelligent Robots and Systems, Tokyo, Japan, Nov. 3-7, 2013.
Vanderborght, B.; Albu-Schaeffer, A.; Bicchi, A.; Burdet, E.; Caldwell, D.G.; Carloni, R.; Catalano, M.; Eiberger, O.; Friedl, W.; Ganesh, G.; et al. Variable Impedance Actuators: A Review. Robot. Auton. Syst. 2013, 61, 1601-1614.
Romano, F.; Fiorio, L.; Sandini, G.; Nori, F. Control of a Two-DoF Manipulator Equipped with a PNRVariable Stiffness Actuator. In Proceedings of the 2014 IEEE International Symposium on Intelligent Control (ISIC), Juan Les Pins, France, Oct. 8-10, 2014.
Jafari, A.; Tsagarakis, N.G.; Sardellitti, I.; Caldwell, D.G. How Design can Affect the Energy Required to Regulate the Stiffness in Variable Stiffness Actuators. In Proceedings of the 2012 IE EE International Conference on Robotics and Automation, Saint Paul, MN, USA, May 14-18, 2012.
Barrett, E.; Fumagalli, M.; Carloni, R. Elastic Energy Storage in Leaf Springs for a Lever-Arm Based Variable Stiffness Actuator. In Proceedings of the 2016 IEEE/RSJ International Conference on Intelligent Robots and Systems (IROS), Daejeon, Korea, Oct. 9-14, 2016.
Visser, L.C.; Carloni, R.; Klijnstra, F.; Stramigioli, S. A Prototype of a Novel Energy Efficient Variable Stiffness Actuator. In Proceedings of the 2010 Annual International Conference of the IEEE Engineering in Medicine and Biology, Buenos Aires, Argentina, Aug. 31-Sep. 4, 2010.
Carloni, R.; Marconi, L. Limit Cycles and Stiffness Control with Variable Stiffness Actuators. In Proceedings of the 2012 IEEE/RSJ International Conference on Intelligent Robots and Systems, Vilamoura, Portugal, Oct. 7-12, 2012.
Huang, T.H.; Kuan, J.Y.; Huang, H.P. Design of a New Variable Stiffness Actuator and Application for Assistive Exercise Control. In Proceedings of the 2011 IEEE/RSJ International Conference on Intelligen t Robots and Systems, San Francisco, CA, USA, Sep. 25-30, 2011.
Bacek, T.; Unal, R.; Moltedo, M.; Junius, K.; Cuypers, H.; Vanderborght, B.; Lefe, D. Conceptual Design of a Novel Variable Stiffness Actuator for Use in Lower Limb Exoskeletons. In Proceedings of the 2015 IEEE International Conference on Rehabilitation Robotics (ICORR), Singapore, Aug. 11-14, 2015.
Cui, Z.; Cui, Y.; Qian, D.; Song, W.; Li, Y. Simulation Research and Experimental Verification of a Variable Stiffness Actuator with Automatic Rigidity/Compliance Switching. In Proceedings of the 2015 IEEE International Conference on Robotics and Biomimetics (ROBIO), Zhuhai, China, Dec. 6-9, 2015.
Tonietti, G.; Schiavi, R.; Bicchi, A. Design and Control of a Variable Stiffness Actuator for Safe and Fast Physical Human/Robot Interaction. In Proceedings of the 2005 IEEE International Conference on Robotics and Automation, Barcelona, Spain, Apr. 18-22, 2005.
Sunghoi, H.; Tonietti, G.; Bicchi, A. Neural Network Based Robust Adaptive Control for a Variable Stiffness Actuator. In Proceedings of the 2008 16th Mediterranean Conference on Control and Aut omation, Ajaccio, France, Jun. 25-27, 2008.
Sardellitti, I.; Medrano-Cerda, G.; Tsagarakis, N.G.; Jafari, A.; Caldwell, D.G. A Position and Stiffness Control Strategy for Variable Stiffness Actuators. In Proceedings of the 2012 IEEE International Conference on Robotics and Automation, Saint Paul, MN, USA, May 14-18, 2012.
Sardellitti, I.; Medrano-Cerda, G.; Tsagarakis, N.G.; Jafari, A.; Caldwell, D.G. Gain Scheduling Control for a Class of Variable Stiffness Actuators Based on Lever Mechanisms. IEEE Trans. Robot. 2013, 29, 791-798.
Macnard, T.; Grioli, G.; Bicchi, A. A Real Time Robust Observer for an Agonist-Antagonist Variable Stiffness Actuator. In Proceedings of the 2013 IEEE International Conference on Robotics and Automation, Karlsruhe, Germany, May 6-10, 2013.
Popov, et al., Twisted String Actuators: Outline, Applications, and Challenges, Actuators workshop IROS 2014.
Macnard, T.; Grioli, G.; Bicchi, A. A Stiffness Estimator for Agonistic-Antagonistic Variable-Stiffness-Actuator Devices. IEEE Trans. Robot. 2014, 30, 1269-1278.
Shintake, J.; Schubert, B.; Rosset, S.; Shea, H.; Floreano, D. Variable Stiffness Actuator for Soft Robotics Using Dielectric Elastomer and Low-Melting-Point Alloy. In Proceedings of the 2015.
Schimmels, J.M.; Garces, D.R. The Arched Flexure VSA: A Compact Variable Stiffness Actuator with Large Stiffness Range. In Proceedings of the 2015 IEEE International Conference on Robotics and Automation (ICRA), Seattle, WA, USA, May 26-30, 2015.
Jafari, A.; Tsagarakis, N.G.; Caldwell, D.G. AwAS-II: A New Actuator with Adjustable Stiffness Based on the Novel Principle of Adaptable Pivot Point and Variable Lever Ratio. In Proceedings of the 2011 IEEE International Conference on Robotics and Automation, Shanghai, China, May 9-13, 2011.

\* cited by examiner

MECHANICALLY OVER-DAMPED ACTUATORS HAVING ADJUSTABLE STIFFNESS

CROSS-REFERENCE TO RELATED APPLICATION

This application claims priority to U.S. Provisional Application Ser. No. 62/755,754, filed Nov. 5, 2018, which is hereby incorporated by reference herein in its entirety.

BACKGROUND

Variable stiffness actuators (VSAs) are a new generation of robotic actuators that are proposed to enable stiffness adjustment in addition to the ability to tune position. This stiffness adjustability is a necessity in many applications, especially in physical human-robot interactions (pHRIs) in which robots and humans work in close proximity. In such circumstances, safety can be ensured by providing an elastic element, e.g., a spring, which enables inherent mechanical compliance to be built into traditionally rigid components.

Despite the numerous advantages of VSAs, using them often leads to difficulty in applications necessitating high accuracy or precision. By building in inherent mechanical compliance, the true position of an end effector will differ from the position of the motor driving it any time the system is disturbed. This problem can be considerably amplified in joints that do not also incorporate some type of damping in their control systems. As a result, oscillation and overshooting are nearly always unavoidable phenomena in this type of actuator. Overshooting is also a critical concern in terms of safety as it often entails releasing potential energy stored in the spring that, in high speed scenarios (e.g., step response), could lead to high and uncontrollable output power. This can result in chaotic motion of the output link that can pose a danger to any surrounding human beings.

In order to address these issues, developers of VSAs typically implement sophisticated control algorithms that take into account the output link's velocity and model-based stiffness at each instance of time. Then, through some linearization techniques, the best performance of the system, i.e., minimum overshooting or settling time, can be achieved. Unfortunately, such control approaches always come with intrinsic constraints on maximum velocity and changes in stiffness that counter the advantages these techniques provide.

From the foregoing discussion, it can be appreciated that it would be desirable to have a highly accurate actuator with which overshooting and oscillation are controlled.

BRIEF DESCRIPTION OF THE DRAWINGS

The present disclosure may be better understood with reference to the following figures. Matching reference numerals designate corresponding parts throughout the figures, which are not necessarily drawn to scale.

FIG. 1A shows an initial equilibrium position while FIG. 1B shows the lever deflected due to an applied force.

DETAILED DESCRIPTION

As described above, it would be desirable to have highly accurate actuators with which overshooting and oscillation are controlled. Disclosed herein are examples of such actuators. More particularly, disclosed are mechanically over-damped actuators with which overshooting and oscillation are mechanically controlled. In some embodiments, the actuators each comprise an output link having a pivotable lever and a torsion spring. When the output link or a components mounted to it contacts an object, for example during the execution of a robotic task, a force is applied to the lever that causes it to pivot against the force provided by a first leg of the spring. When the force is removed, the first leg of the spring returns the lever to its initial equilibrium position. At that point, a second leg of the spring opposes further motion of the lever, thereby controlling overshoot. In this manner, oscillation of the output link is controlled.

In the following disclosure, various specific embodiments are described. It is to be understood that those embodiments are example implementations of the disclosed inventions and that alternative embodiments are possible. Such alternative embodiments can include hybrid embodiments that incorporate features of different embodiments. All such embodiments are intended to fall within the scope of this disclosure.

Described in the present disclosure are mechanically over-damped actuators having adjustable stiffness. Instead of relying on a control strategy to accurately position the moving complaint output link, the actuators are designed to mechanically over-damp motion. This is achieved by implementing stepwise impedance of an output link of the actuator by enabling the impact of two rigid bodies. In this case, part of the kinetic energy of the output link is removed from the system and thus the output link will be immediately settled to its target position without the need for any control. Such actuators are well suited for use in applications in which safety and accuracy in positioning are critical determinants. In addition to being mechanically over damped, the output links of the actuators have full access to the energy storage capacity of their stiffness adjustment mechanisms.

Figure 1A:
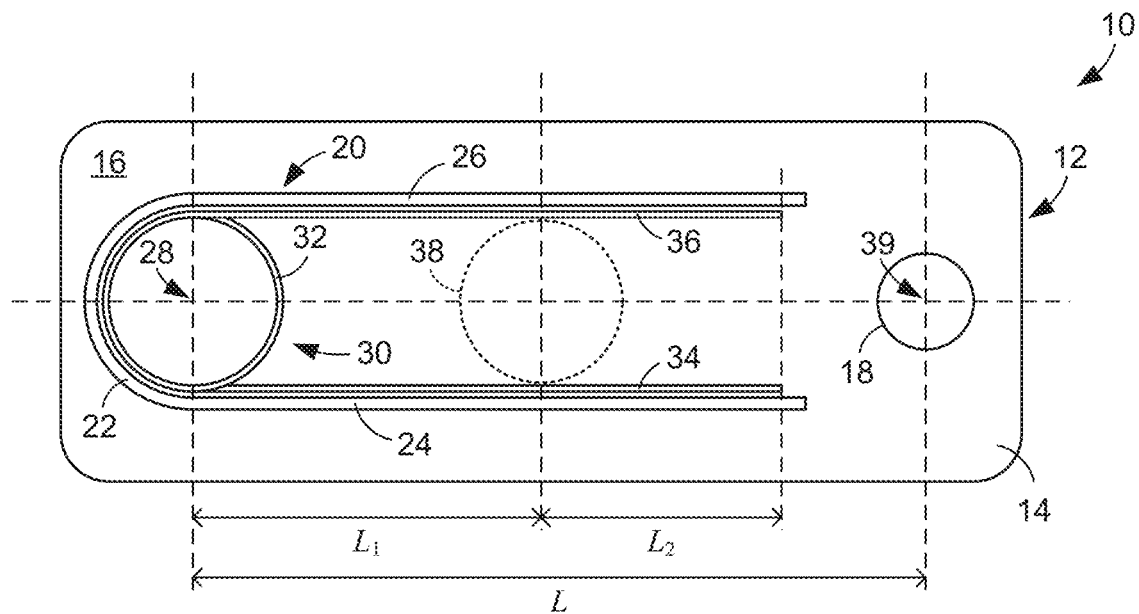
FIGS. 1A and 1B are schematic diagrams illustrating the principles of a mechanically over-damped actuator having adjustable stiffness. A lever and a torsion spring with a stiffness K are concentrically arranged and unidirectionally connected at their leg sides. A pivot element can travel inside the lever.
Figure 1B:
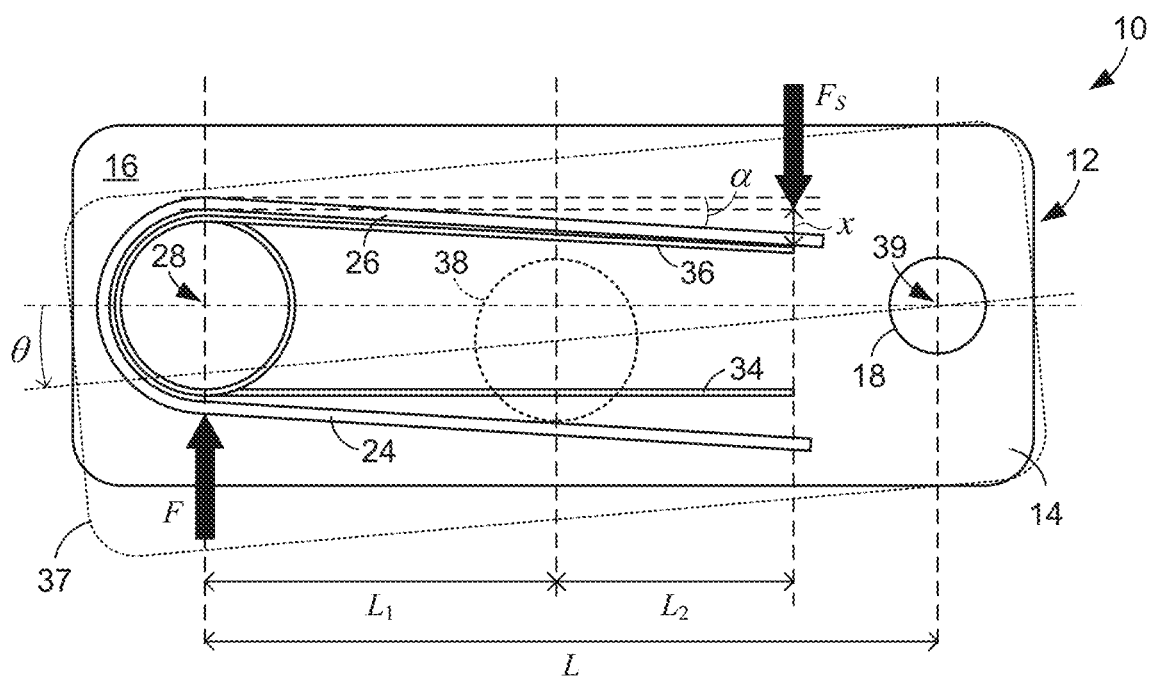

FIGS. 1A and 1B schematically illustrate an embodiment of a mechanically over-damped actuator 10 having adjustable stiffness. As shown in these figures, the actuator 10 includes an output link 12 that comprises an elongated, rectangular, planar plate 14. The plate 14 comprises a planar surface 16 and a circular opening 18 provided at one end that extends through the plate. Provided on the plate 14 is a pivotable lever 20. The 20 is U-shaped and, therefore, comprises an arcuate (e.g., semicircular) U-shaped portion 22 from which extend two generally parallel, elongated legs 24 and 26. As described in greater detail below, the lever 20 can pivot relative to plate 14 about a lever pivot axis 28, which is coincident with the central axis of the U-shaped portion 20.

Mounted to the plate 14 and surrounded by the pivotable lever 20 is a torsion spring 30. The spring 30 comprises a coiled portion 32 including two or more concentric circular revolutions of wire of which the spring is made, and two generally parallel, elongated legs 34 and 36. As is apparent from FIG. 1A, which shows the output link 12 and the lever 20 in an initial equilibrium position in which the lever has not been pivoted relative to the plate 14, the coiled portion 32 of the spring 30 is generally concentric with the arcuate U-shaped portion 22 of the lever 20 in the initial equilibrium position. Furthermore, the legs 34, 36 of the spring 30, which may be approximately the same lengths as the legs 24, 26 of the lever 20, are generally parallel to and in contact or nearly in contact with the legs of the lever when the output link 12 and lever are in their initial equilibrium positions. The spring 30, however, is independent of the lever 20 and, therefore, is not fixedly attached to lever. Instead, as discussed below, the legs 34, 36 of the spring 20 interface with the legs 24, 26 of the lever 20 such that pivoting of the lever causes one of the lever's legs to deflect one of the legs of the spring against the force of the spring. Accordingly, the spring 30 can be said to oppose (i.e., apply opposing force to) pivoting of the lever 20 in either pivotable direction away from the initial equilibrium position of FIG. 1A. An example of this is illustrated in FIG. 1B, which is described below.

The output link 12 is used in conjunction with an input link 37 (represented with dotted lines in FIG. 1B) from which a cylindrical pivot element 38 extends. As shown in FIGS. 1A and 1B, the pivot element 38 is positioned between the legs 24, 26 of the lever 20 and has a diameter that is nearly the same dimension as the distance between the legs. Also extending from the input link 39 is a fixed shaft (not shown) that is configured to pass through the opening 18 provided in the plate 14. The shaft can be connected to a motor that can rotate the shaft and the input link 37 about an axis of rotation 39 that is coincident with the center of the opening 18 and the shaft. The output link 12 can rotate about the shaft.

FIG. 1B illustrates an example of what happens when there is relative movement between the output link 12 and the input link 37. Such relative movement may occur, for example, when the output link 12 (or a component attached to it, such as an armature) makes contact with another object, for example when a robot that incorporates the actuator 10 performs a task. In the example of FIG. 1B, relative movement between the output link 12 and the input link 37 is illustrated by the input link being rotated an angle θ relative to the output link. Force, F, imposed upon the output link 12 is transmitted to the lever 20 by the pivot element 38 of the input link 37, causing the lever to pivot about its pivot axis 28 and causing the second leg 26 of the lever to deflect the second leg 36 of the spring 30. Once the force, F, is removed, however, the second leg 36 of the spring 30 applies force against the second leg 26 of the lever 20 to cause the lever to pivot back to its initial equilibrium position shown in FIG. 1A. At that point, the first leg 24 of the lever 20 comes into contact with the first leg 34 of the spring 30, which opposes further pivoting of the lever, thereby controlling overshoot of the output link 12. In this manner, oscillation of the output link 12 can be controlled.

In some embodiments, the position of the pivot element 38 along the length of the pivotable lever 20 is linearly adjustable. Adjusting the position of the pivot element 38 in this manner adjusts the stiffness of the actuator 10. In particular, the closer the pivot element 38 is positioned to the arcuate U-shaped portion 22 of the lever 20, the softer the actuator 10 will be. Assume, for example, that the pivot element 38 is located at the distance of $L_1$ from pivot axis 28 of the lever 20 and $L_2$ from a force point, as shown in FIG. 1B. The distance between the pivot axis 28 and the rotation axis 39 is L, as is also shown in the figures. The spring 30 has a stiffness of K. As the output link 12 becomes deflected relative to the input link 37 by θ, the lever 20 pivots by an angle α:

$$\alpha = \tan^{-1}\left(\frac{L\tan\theta}{L_1}\right) \quad (1)$$

and thus, the spring 30 becomes deflected by the distance x:

$$x = L_2(\tan\alpha) = (L\tan\theta)\frac{L_2}{L_1} \quad (2)$$

The spring's rotary deflection β will be:

$$\beta = \tan^{-1}\frac{x}{L_1 + L_2} \quad (3)$$

Therefore, the torque acting on the spring $T_s$ can be found as:

$$T_s = K\beta \quad (4)$$

and thus, for small deflections, the force acting on the spring 30 at its connection point with the lever 20, would be:

$$F_s = \frac{T_s}{L_1 + L_2} = K\frac{x}{(L_1 + L_2)^2} \quad (5)$$

This force will balance the force acting on the other side of the lever F, therefore:

$$F = F_s\frac{L_2}{L_1} \quad (6)$$

This force will be acting on the output link at the distance of L from its center of rotation. Consequently, the torque on the output link will be:

$$T = FL \quad (7)$$

Therefore, using Equations (1)-(7), the rotary stiffness perceived at the link side $K_{link}$ can be simplified as:

$$K_{link} = \frac{T}{\theta} = K\frac{L^2}{(L_1 + L_2)^2}\frac{L_2^2}{L_1^2} \quad (8)$$

for small deflections.

Figure 2:
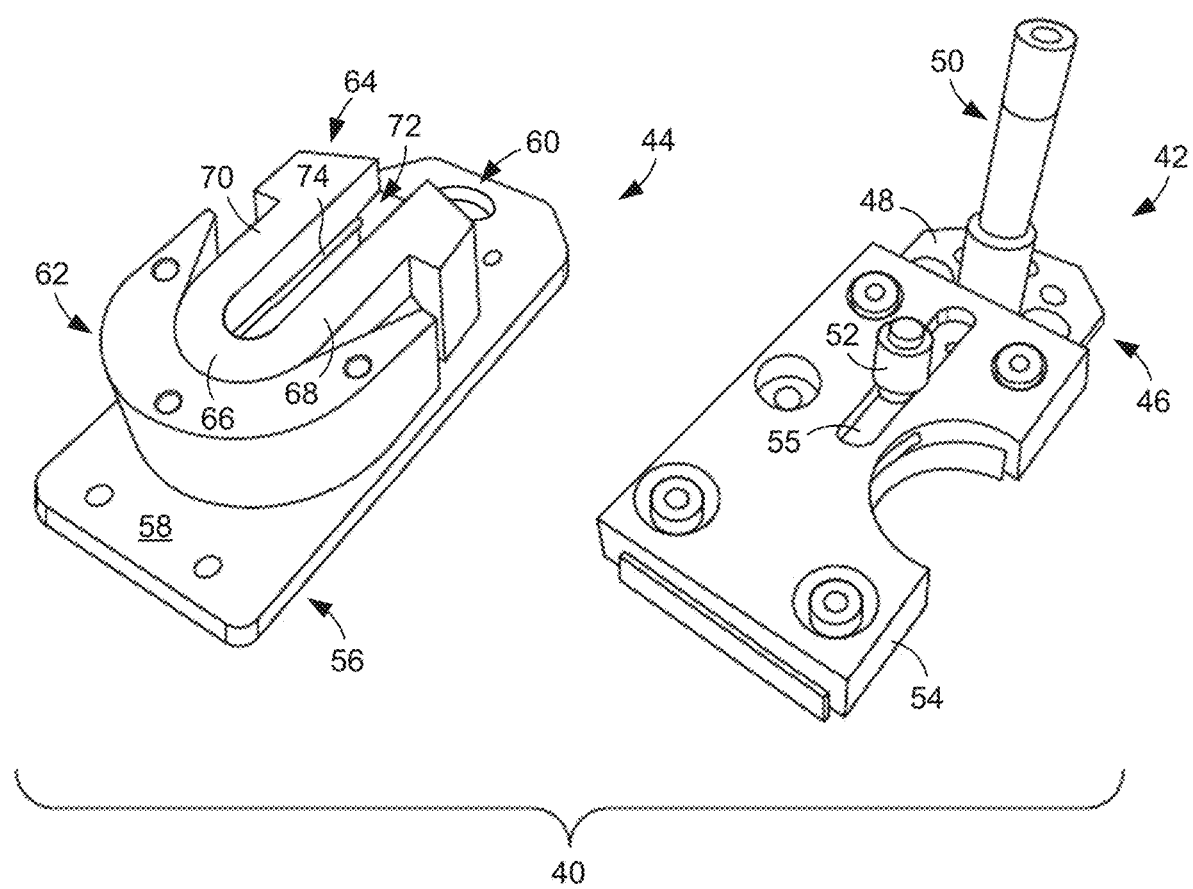
FIG. 2 is a perspective view that shows an input link and an output link of a prototype mechanically over-damped actuator.

FIG. 2 illustrates a prototype mechanically over-damped actuator 40 that incorporates the principles illustrated in FIG. 1. As with the actuator 10, the actuator 40 includes an input link 42 and an output link 44 that are used in conjunction with each other. As depicted in FIG. 2, the input link 42 generally comprises an elongated rectangular planar metal plate 46 having a planar surface 48. Extending perpendicularly outward from the planar surface 48 are a fixed cylindrical shaft 50 and an adjustable cylindrical pivot element 52. The input link 42 further includes a low-friction element 54 that reduces friction between the input link and a pivotable lever of the output link 44. The linear position of the pivot element 52 can be adjusted along a linear slot 55 formed through the low-friction element 54 and the plate 46.

The output link 44 also comprises an elongated rectangular planar metal plate 56 having a planar surface 58. Formed through the plate 56 at one end is a circular opening 60 that is configured to receive the cylindrical shaft 50 of the input link 42. Extending perpendicularly upward from the surface 58 at the other end of the plate 56 is a U-shaped mechanical stop 62 that partially surrounds a pivotable lever 64. As with the lever 20 of FIG. 1, the lever 64 is U-shaped and, therefore, comprises an arcuate (e.g., semicircular) U-shaped portion 66 from which extends two generally parallel, elongated legs 68 and 70. The lever 64 can pivot relative to the plate 56 about a pivot axis that, like that of the lever 20, is located within the U-shaped portion 66 of the lever. As can be appreciated from FIG. 2, the mechanical stop 62 limits the angle through which the lever 64 can pivot in either direction.

The output link 44 further includes a torsion spring 72 that is fixedly mounted to the plate 56 and surrounded by the pivotable lever 64. As above, the spring 72 comprises a coiled portion (not visible in FIG. 2) positioned within the U-shaped portion 66 of the lever 64 and two generally parallel, elongated legs 74 (only one of which visible in FIG. 2) that respectively extend along the inner sides of the legs 68, 70 of the lever.

The actuator 40 can be assembled by connecting the input link 42 to the output link 44. In the arrangement of the two components shown in FIG. 2, the output link 44 can be inverted (i.e., rotated 180 about its longitudinal axis) and can be mounted to the input link 42 with the shaft 50 of the input link passing through the opening 60 in the plate 56 of the output link and the pivot element 52 positioned between the legs 68, 70 of the lever 64. Once the actuator 40 is assembled in this manner, it is in the initial equilibrium position in which the lever 64 is centered as shown in FIG. 2. As can be appreciated from FIG. 2, when the output link 44 (or a component mounted to it) contacts another object as the output link and the input link 42 rotate about the shaft 50, force imposed on the output link cause the plate 56 of the output link to rotate relative to the input link (about the rotation axis defined by the shaft). When this occurs, one of the legs 68, 70 transmits the force to the pivot element 52. Because the pivot element 52 is fixed to the plate 46 of the input link 42, this transmission of force causes the lever 64 to pivot away from its initial equilibrium position against the force applied by one of the legs 74 of the spring 72. Once the force applied by the object is removed (e.g., because it or the actuator 40 moves), however, the other leg 74 of the spring 72 returns the lever 64 to its initial equilibrium position shown in FIG. 2.

Figure 3:
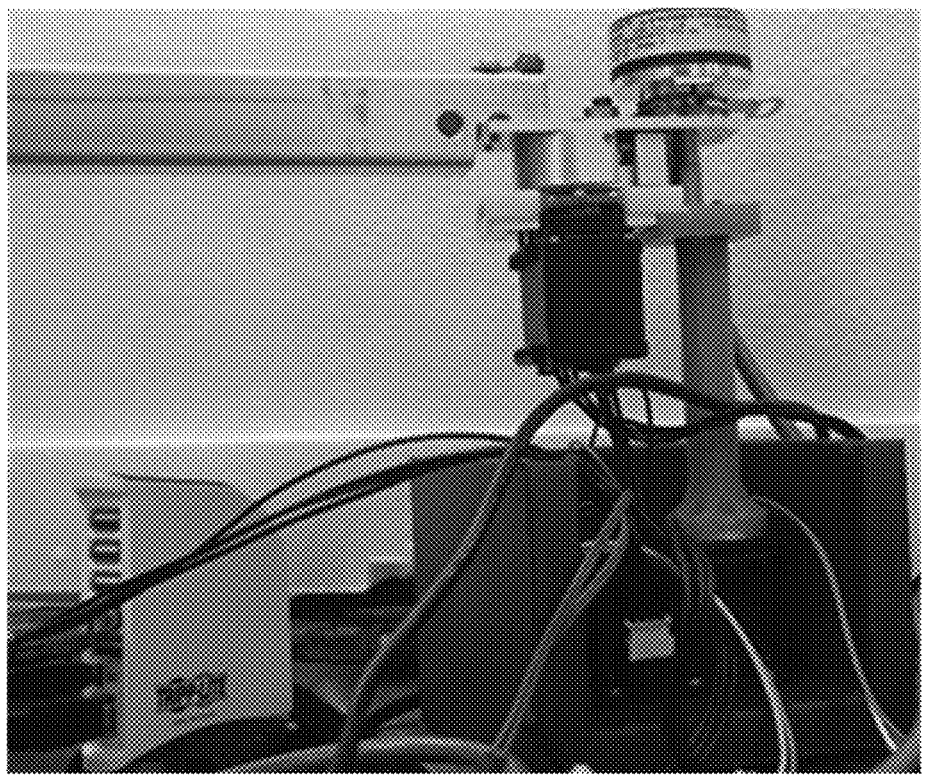
FIG. 3 is a photograph of testing of the prototype actuator of FIG. 2.

The assembled actuator was tested to evaluate its performance. FIG. 3 is a photograph that shows the actuator within the testing apparatus. The apparatus included motors that respectively rotate the shaft and linearly displace the pivot element of the input link. In addition, the apparatus included an arm that was mounted to the output link.

The rigid collision between the spring's "undeflected" leg and a leg of the lever is the underlying principle that enables the actuator (system) to be mechanically over-damped. As the force is removed from the lever and it moves back to its equilibrium position under the force of the spring, there will be a collision between the undeflected spring leg and the leg of the lever that was not in contact with the deflected spring leg. This impact between two rigid elements will suddenly neutralize the kinetic energy and, consequently, the lever will stop at its equilibrium position instead of overshooting and/or oscillating.

From the energy point of view, the kinetic $E_{kinetic}$ and potential $E_{potential}$ energy of the output link are:

$$E_{potential} = \frac{1}{2} K_{link} \theta^2 \qquad (9)$$

$$E_{kinetic} = \frac{1}{2} I_{link} \left(\frac{d\theta}{dt}\right)^2$$

where $I_{link}$ and $d\theta/dt$ are the inertia and velocity of the output link, respectively. Initially, when the output link is deflected due to an external force, the kinetic energy is zero and the potential energy is:

$$E_{potential} = \frac{1}{2} K_{link} \theta_{max}^2$$

$$E_{kinetic} = 0 \qquad (10)$$

where $\theta_{max}$ is the maximum deflection of the link (~0.3 rad). Once the force is removed, the link will accelerate and its speed increases. The increase in speed increases the kinetic energy and simultaneously the potential energy will be reduced as the deflection decreases. The total energy will remain constant. Immediately before the link reaches its equilibrium position (before collision), its speed reaches the maximum level and deflection tends to zero. Therefore:

$$E_{kinetic} = \frac{1}{2} I_{link} \left(\frac{d\theta}{dt}\right)^2_{max} \qquad (11)$$

$$E_{potential} = 0$$

The total energy of the link will remain constant until the collision. Therefore, using equations 10 and 11, one can determine the link maximum velocity as:

$$\left.\frac{d\theta}{dt}\right|_{max} = \sqrt{\frac{K_{link}}{I_{link}}} \, \theta_{max} \qquad (12)$$

Immediately after the collision, the output link velocity will be dropped to $(d\theta/dt)_{ac}$. Therefore, the link's kinetic and potential energy after collision will be:

$$E_{kinetic_{ac}} = \frac{1}{2} I_{link} \left(\frac{d\theta}{dt}\right)^2_{ac} \qquad (13)$$

$$E_{potential_{ac}} = 0$$

The total energy of the system will be reduced after the collision. One can define a new parameter, the damping scale DS, as:

$$DS = \frac{\frac{d\theta}{dt}\big|_{ac}}{\frac{d\theta}{dt}\big|_{max}} \quad (14)$$

DS is a function of link stiffness. In the disclosed system, the DS parameter is usually small, especially for high stiffness values. The higher is the stiffness, the more energy that will be removed from the system at the instance of the collision. The link overshoot $\theta_{os}$ can be found as:

$$\theta_{os} = \sqrt{\frac{K_{link}}{I_{link}}} \frac{d\theta}{dt}\bigg|_{ac} \quad (15)$$

A small DS implies a large reduction in the speed after the collision, which would lead to negligible link overshoot for high stiffness values. This means that the system is mechanically over-damped, especially when the output link is highly compliant. This behavior is geared toward safety since a low-compliance link will have no oscillation as it will be over-damped. A high-compliance link with a small amount of overshooting will also be safe for human interaction as the link will not pose any danger during a collision with human body. The accuracy of positioning, however, will be affected by the link overshooting.

Safety of interaction is a critical factor when a robotic arm touches a human body. In such case, the arm should be easily deflectable to guarantee that the impact is under control and not harmful. The greater the range of allowable deflection of the output link, the more time the robot sensors and controller have to react, thus a more safe interaction can be achieved. Deflection of the output link is enabled by deflection of the spring. In other words, the potential energy of the output link is associated with the potential energy of the spring. In most of VSAs, the link has very limited accessibility to the potential energy of the springs, which can greatly limit the deflection range of the output link or output power. With the disclosed actuators, however, the maximum potential energy that can be stored into spring is:

$$E_{potential_s} = \tfrac{1}{2} K \beta_{max}^2 \quad (16)$$

where $\beta_{max}$ is the maximum angular deflection of the spring. Using Equation (3), the maximum linear deflection of the spring leg at its contact point with the lever for small deflections can be found as:

$$x_{max} = (L_1 + L_2)\beta_{max} \quad (17)$$

Using Equation (2), the maximum link deflection will be:

$$\theta_{max} = x_{max} \frac{L_1}{LL_2} \quad (18)$$

By plugging Equations (17), (18), and (8) into Equation (10), the maximum potential energy of the output link can be found as:

$$E_{potential} = \tfrac{1}{2} K_{link} \theta_{max}^2 = \tfrac{1}{2} K\theta \beta_{max}^2 \quad (19)$$

Clearly, this energy is exactly the same as the potential energy of the spring in Equation (16). Therefore, theoretically, the output links of the disclosed actuators have full access to the energy storage capacity of the spring.

As noted above, the prototype actuator had two motors, one motor dedicated to link angular positioning and the other motor assigned to stiffness regulation. A rack-and-pinion mechanism was used to move the pivot element inside the lever using the second motor. The rack was mounted on the lever and the pinion is assembled on the second motor shaft. A light aluminum arm with a length of 50 cm was mounted to the output link in order to achieve a more distinguishable overshooting. The torsion spring had a stiffness of 10 Nm/rad. The maximum deflection of this torsion spring was around 60°. The system was mounted on a table to facilitate experimentation. The physical specifications of the prototype are presented in Table 1. The angular positions of the two motors were measured using their built-in position sensors, while the position of the output link was read using a rotary encoder attached to the link. The difference between first motor position and that of the output link, i.e., the angular deflection of the output link, can be calculated.

TABLE 1

Physical specification of the Prototype Actuator

| Specification | Value | Specification | Value |
|---|---|---|---|
| Height | 10 cm | Length | 50 cm |
| Width | 10 cm | Weight | 200 g |
| Min. Stiffness | 32 Nm/rad | Rotation Range (Min. Stiffness) | +/−0.3 rad |
| Max. Stiffness | 350 Nm/rad | Rotation Range (Max. Stiffness) | +/−0.3 rad |
| Min. Deflection (Min. Stiffness) | 0.2 rad | Max. Torque | 3.2 Nm |
| Max. Deflection (Max. Stiffness) | 0.15 rad | Max. Velocity | 0.5 rad/s |

Figure 4:
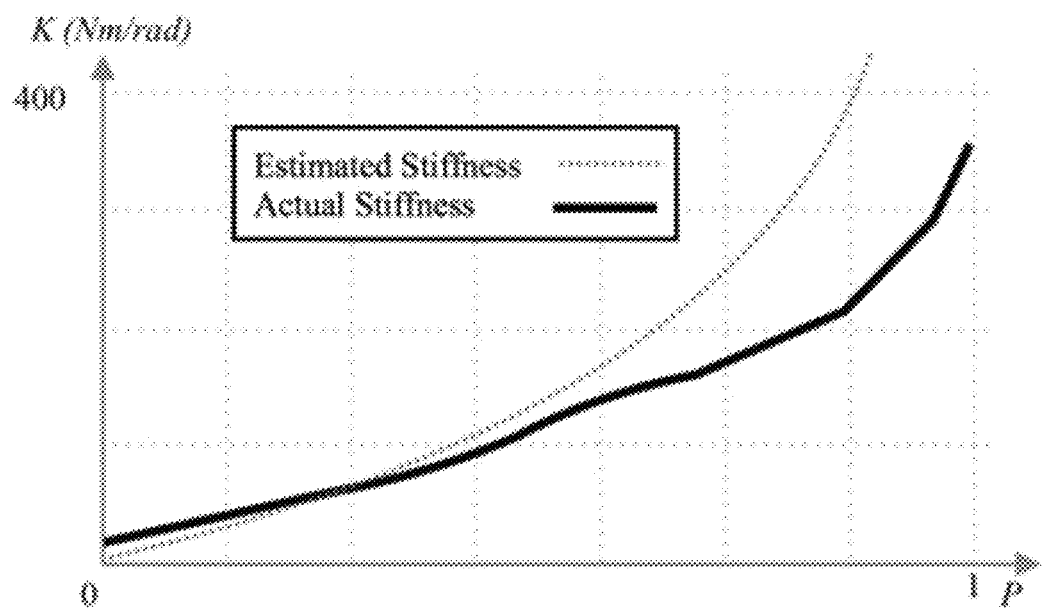
FIG. 4 is a graph that shows actual stiffness versus estimated stiffness for a mechanically over-damped actuator.

The stiffness adjustability and range of the prototype actuator was tested first. For this purpose, the stiffness was set to different values by controlling the position of the pivot element inside the lever using the second motor. For each stiffness value, a known set of different weights was attached to the output link and the defection of output link due to the gravitational force was measured. Stiffness was then calculated by dividing the force by angular deflection of the link. FIG. 4 shows the stiffness as a function of pivot position $p = L_2/L_{lever}$ inside the lever compared to the stimulated stiffness based on Equation (8). As is clear from the graph, the stiffness of the actuator can vary from almost 32 to 350 Nm/rad. The reason the infinite stiffness was not achieved is due to the backlash between the pivot and the lever. Furthermore, zero stiffness cannot be achieved as the actual connection between the lever and spring is not a point contact.

Figure 5A:
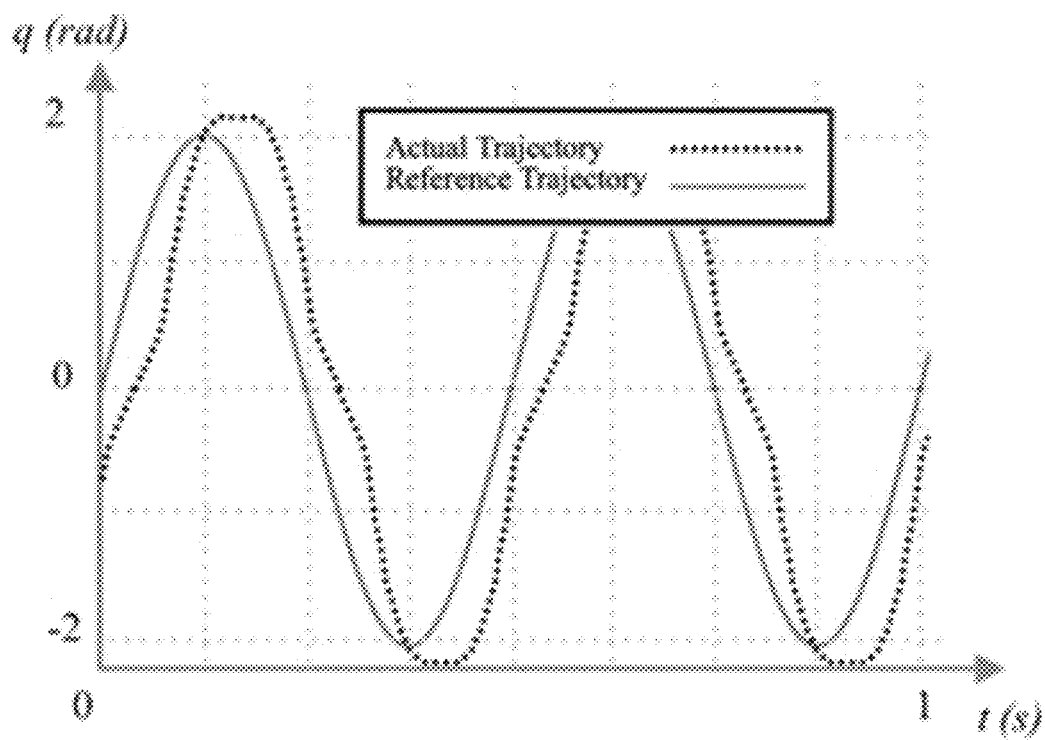
FIGS. 5A-5C are graphs that track a sine wave trajectory of an output link for three cases: (A) very low stiffness K=35 N m/rad, (B) low stiffness K=50 Nm/rad, and (C) high stiffness K=300 Nm/rad.
Figure 5B:
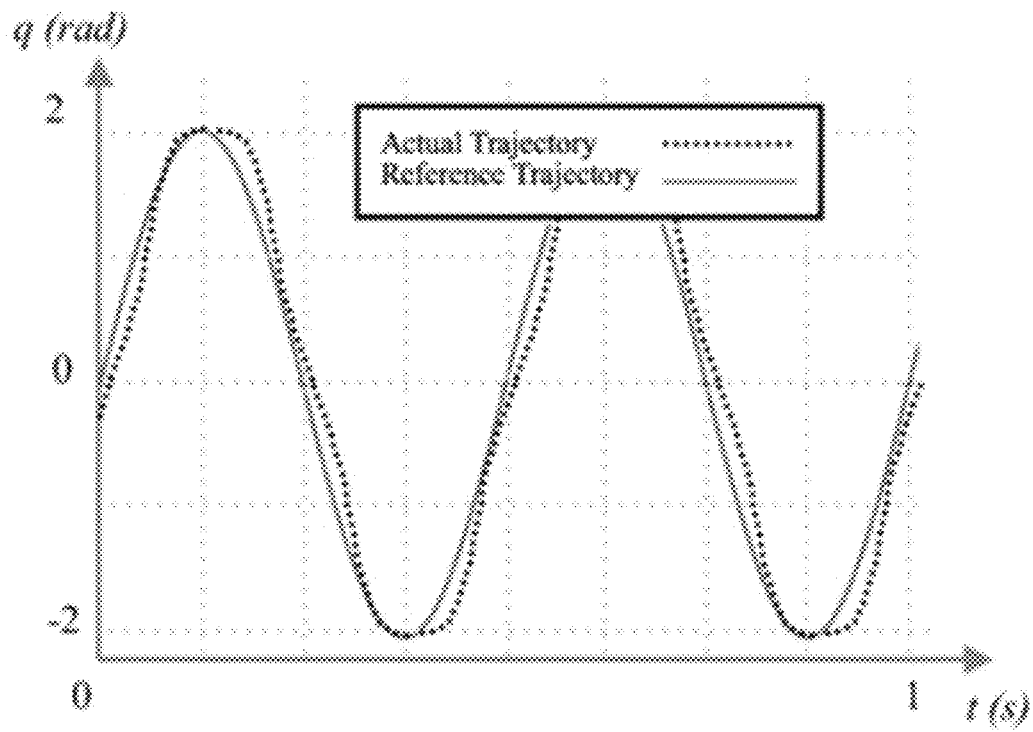
Figure 5C:
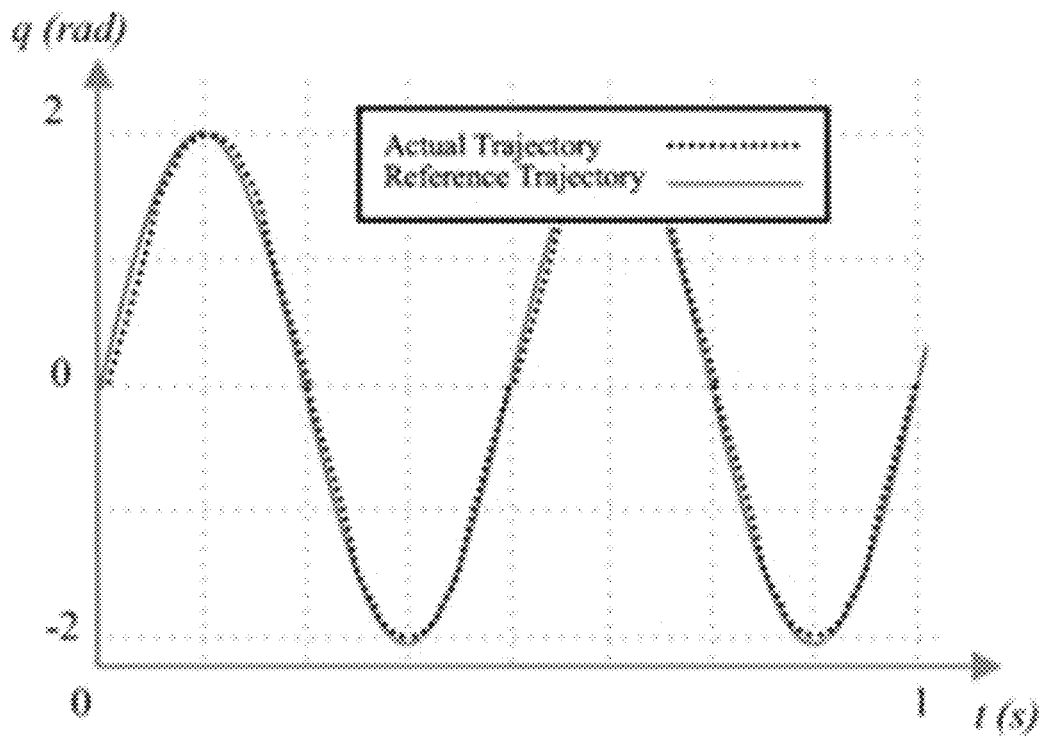

The stiffness was set to three different values: very low (35 Nm/rad), low (50 Nm/rad), and high (300 Nm/rad) and the output link was then commanded to follow a sinusoidal trajectory with the amplitude of 0.2 rad and a frequency of 2 Hz. FIG. 5 shows how output link followed the reference trajectories for these stiffness values. As is shown in FIG. 5, when the link stiffness is very low, there was considerable phase delay between the reference trajectory and the link actual trajectory. There was also a small amount of overshooting when the link stiffness was very low. When the link stiffness was low, there was a very small phase delay between the reference trajectory and the link actual trajectory, while no overshooting was observed. At high stiffness, no overshooting or phase delay between the actual link and reference trajectories was observed.

Figure 6A:
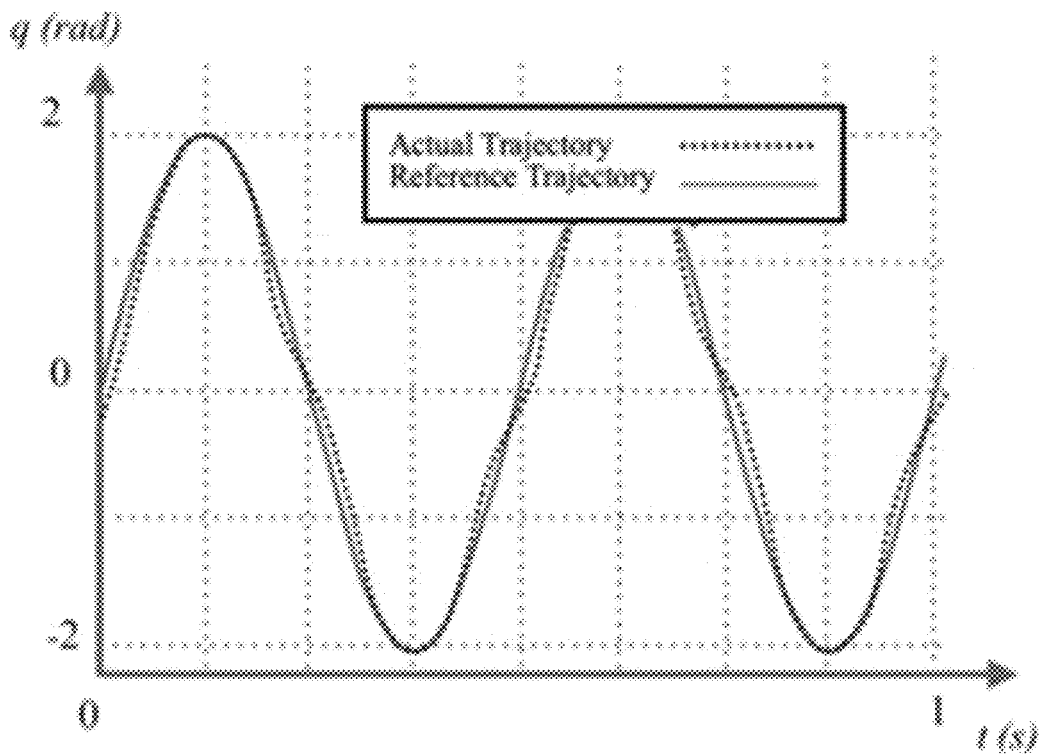
FIGS. 6A and 6B are graphs that track a sine wave trajectory of the output link while the stiffness is changed on-line from (A) very low stiffness K=35 Nm/rad to (B) high stiffness K=300 Nm/rad with 4 Hz frequency.
Figure 6B:
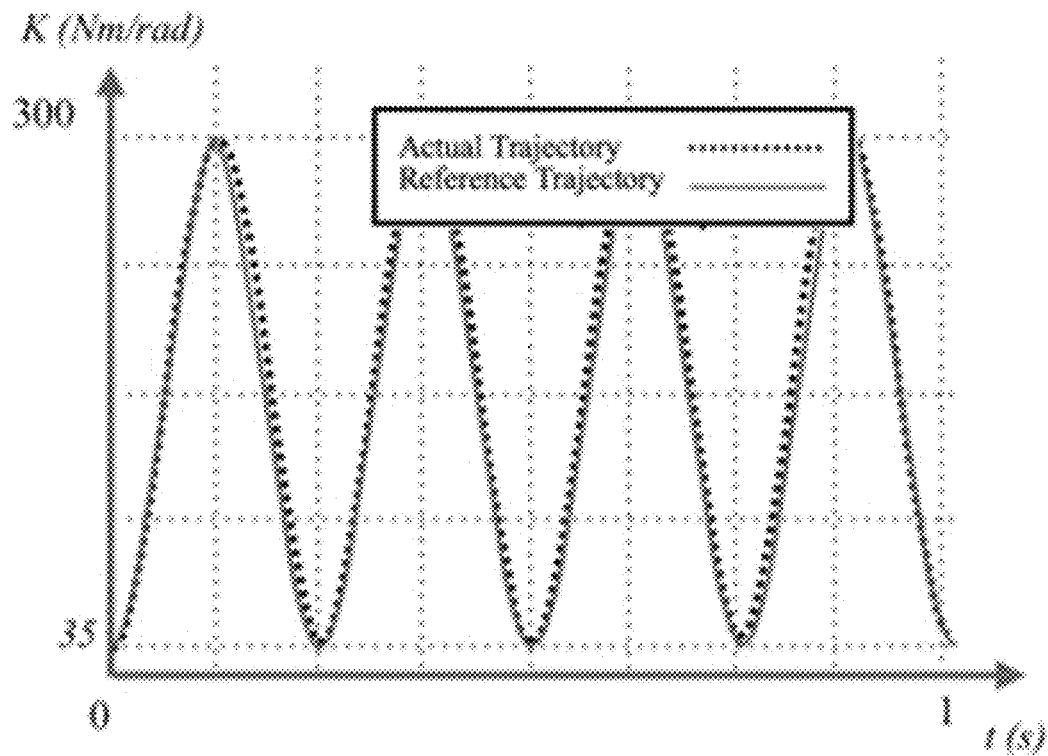

The output link was also commanded to follow the same reference trajectory while the stiffness was changed on-line following a sinusoidal trajectory from 35 Nm/rad to 300 Nm/rad with a frequency of 4 Hz. The result is depicted in FIG. 6. As is clear from the graph, the stiffness motor was able to follow its reference trajectory accurately. While the stiffness was low, the output link had some deviation from its reference trajectory. However, as the stiffness increased, the output link deviation tended to vanish.

Figure 7A:
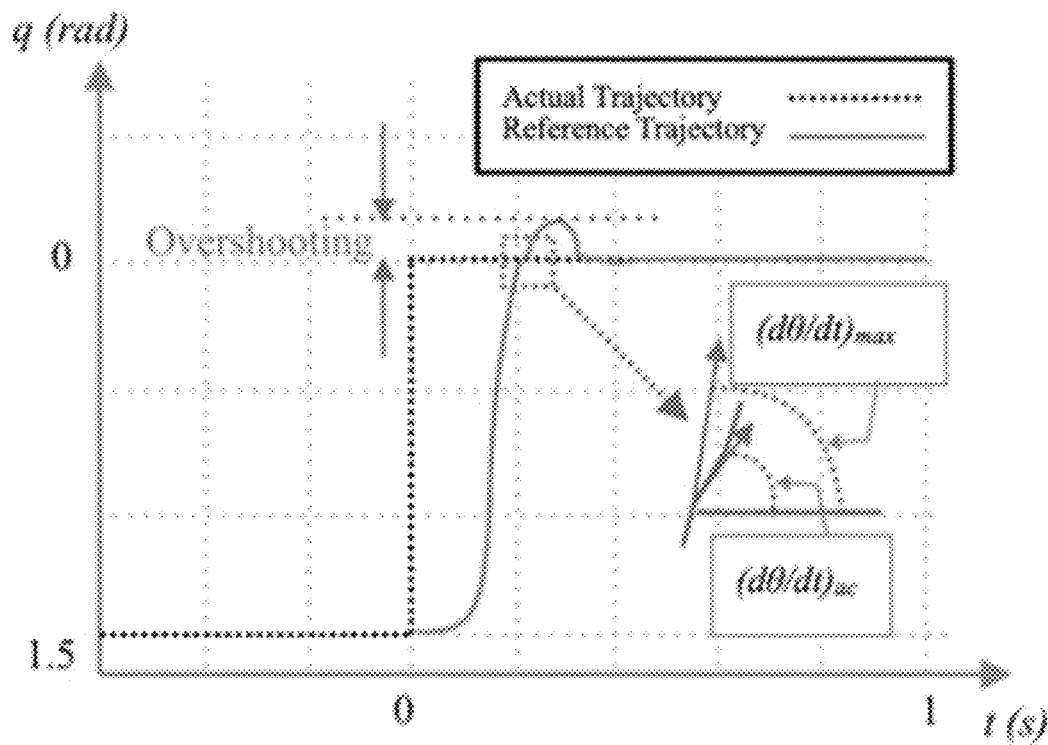
FIGS. 7A and 7B are graphs that track the trajectory of the output link while it is manually deflected by 1.5 rad and reaches its equilibrium position at 0 rad at (A) K=35 Nm/rad and (B) K=50 Nm/rad.
Figure 7B:
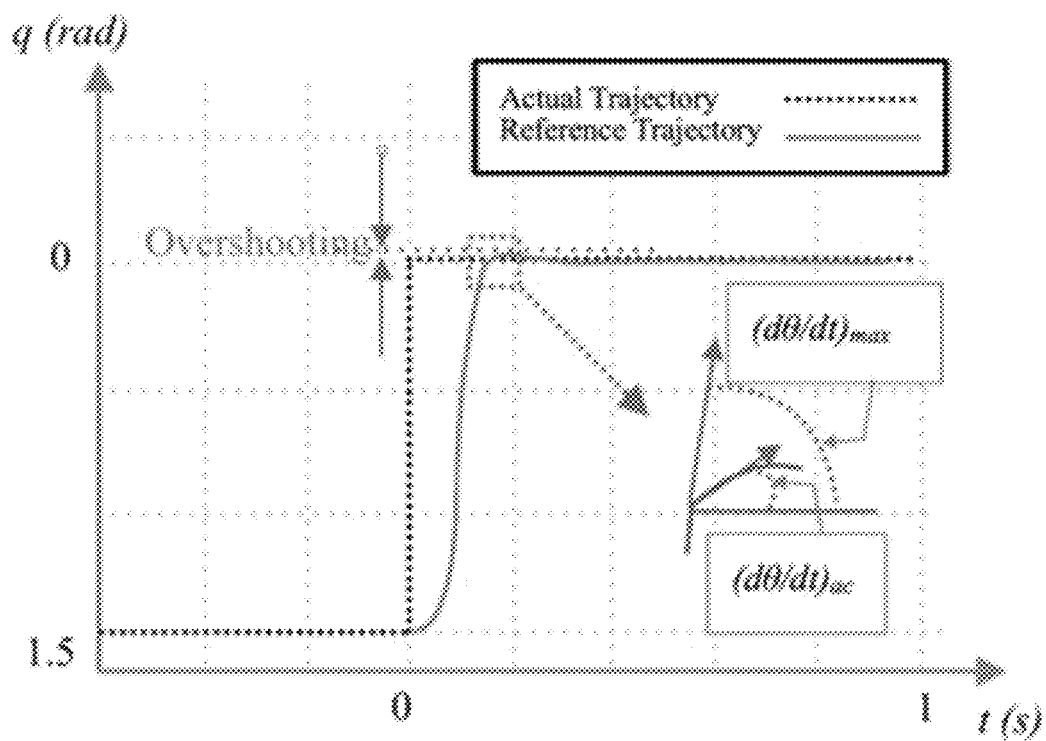

In order to show the over damping capability of the actuator, especially at high stiffness, the position of the output link was set to a certain angle and it was manually pulled away from its equilibrium configuration by 1.5 rad and then released. As a result of the deflection, the link moved back to its equilibrium position. The link trajectory was recorded for three different stiffness values using its dedicated rotary encoder. FIG. 7 shows the link trajectories for the very low and low stiffness values of 35 Nm/rad and 50 Nm/rad, respectively.

Figure 8:
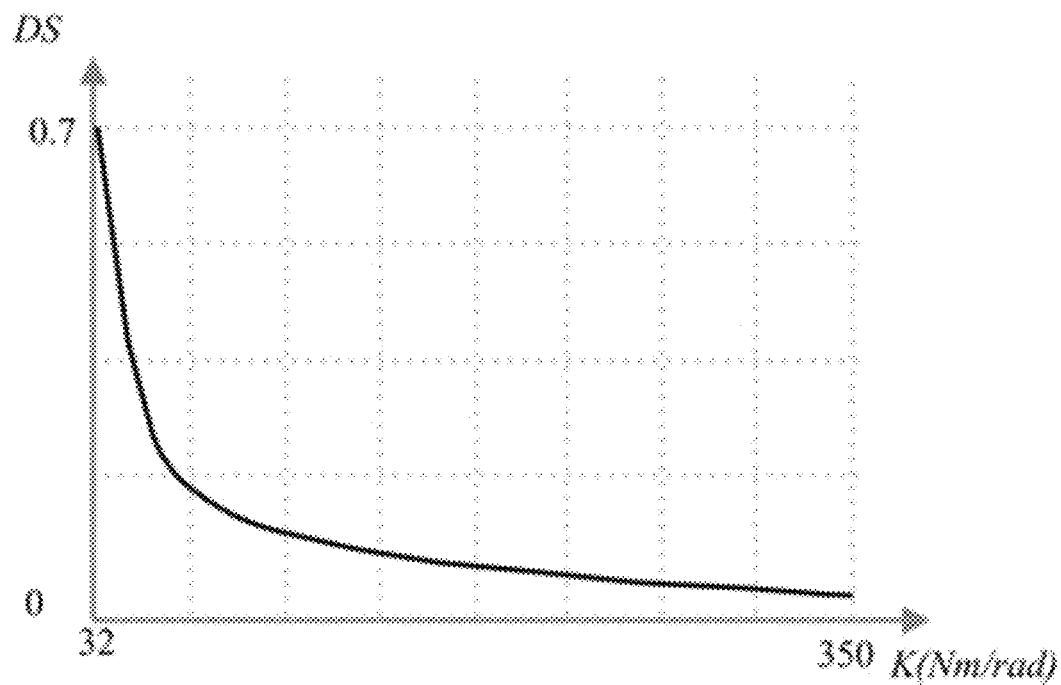
FIG. 8 is a graph that shows a damping scale DS for different link stiffnesses.

The damping scale DS as defined by Equation (14) is the ratio of the link maximum velocity immediately before it reaches its equilibrium position over its velocity immediate after that point (FIG. 6). As is clear from FIG. 7, the DS parameter greatly decreased as the stiffness increased from K=3 Nm/rad to K=50 Nm/rad. This experiment was performed for different values of link stiffness and the DS parameters were calculated in each case. FIG. 8 shows the calculated DS parameters for the different stiffness values.

As is clear from FIG. 8, the DS parameter started from 0.7 at minimum stiffness. This DS ratio resulted in a small amount of overshooting, as shown in FIG. 6. However, by increasing the stiffness, the DS parameter radically tended to zero. This implies the ability of the actuator to mechanically over-dampen the oscillation around its equilibrium position.

In this disclosure, the design and development of a mechanically over-damped actuators having adjustable stiffness were described. The actuator exhibited the capability of mechanically over-damping link oscillation, especially as the stiffness increased. The actuator employs a lever mechanism to regulate the stiffness. By changing the position of the pivot inside the lever, the stiffness of the output link can change from 32 Nm/rad to 350 Nm/rad in 0.2 sec.

Because the disclosed actuators u se a lever mechanism with only one spring as a compliant element, the output link can have full access to the energy storage capacity of the spring. This resulted in achieving large ranges of deflection in a small size. Using only one spring to regulate the stiffness also provides an additional unique feature to the actuator: discontinuity in the velocity as a result of an impact between lever and spring. This sudden change in the velocity greatly reduces the total energy of the link, which, in turn, forces the link to behave like an over-damped system.

The ability of the disclosed actuators in tracking a sine wave, as well as step trajectories, have been experimentally shown. Furthermore, the over-damping capability of the actuators has also been proven by calculating the damping scale parameter at different stiffness values.

The invention claimed is:

1. A mechanically over-damped actuator comprising:
   an output link comprising a lever, a torsion spring associated with the lever, and an opening, wherein the lever has an initial equilibrium position and is pivotable about a pivot axis, wherein the spring opposes pivoting of the lever away from its initial equilibrium position such that the spring returns the lever to the equilibrium position, and
   an input link having a shaft and a pivot element, wherein the shaft extends through the opening of the output link such that the output link can rotate relative to the input link about the shaft and the pivot element is configured to pivot the lever of the output link when a force is applied to the output link.

2. The actuator of claim 1, wherein the lever is U-shaped and has an arcuate U-shaped portion from which extend two legs.

3. The actuator of claim 2, wherein the torsion spring has a coiled portion from which extend two legs, each leg of the spring being positioned next to an inner side of one of the legs of the lever.

4. The actuator of claim 3, wherein when a force is applied to the output link in a first direction, the lever pivots about its pivot axis in a first angular direction and a first leg of the lever deflects a first leg of the torsion spring, and when the force is removed the first leg of the torsion spring urges the first leg of the lever back to the initial equilibrium position.

5. The actuator of claim 4, wherein when a force is applied to the output link in a second direction, the lever pivots about its pivot axis in a second angular direction and a second leg of the lever deflects a second leg of the torsion spring, and when the force is removed the second leg of the torsion spring urges the second leg of the lever back to the initial equilibrium position.

6. The actuator of claim 2, wherein the pivot element of the input link is positioned between the legs of the lever of the output link.

7. The actuation or claim 6, wherein the pivot element is linearly adjustable relative to the lever and wherein the position of the pivot element along a length of the lever changes a stiffness of the actuator.

8. The actuator of claim 1, wherein the output link further comprises a mechanical stop that limits the extent to which the lever can pivot from side to side.

9. A mechanically over-damped actuator comprising:
   an input link including a plate from which outwardly extend a shaft and a pivot element; and
   an output link mounted to the input link, the output link including a plate having an opening through which the shaft of the input link extends, the output link further including a pivotable lever and a torsion spring that is surrounded by the lever, the lever including an arcuate U-shaped portion from which extend first and second legs, the torsion spring including a coiled portion from which extend first and second legs, the coiled portion of the spring being positioned within the U-shaped portion of the lever, the first leg of the spring being positioned next to an inner side of the first leg of the lever, and the second leg of the spring being positioned next to an inner side of the second leg of the lever, wherein the pivot element of the input link is positioned between the first and second legs of the lever;
   wherein when a force is applied to the output link, the plate of the output link rotates relative to the input link about the shaft and the pivot element causes the lever to pivot about a pivot axis away from an initial equilibrium position, wherein the pivoting of the lever causes the first leg of the lever to deflect the first leg of the spring,
   wherein when the force is removed from the output link, the first leg of the spring urges the lever back to its equilibrium position and the second leg of the spring interfaces with the second leg of the lever to prevent the lever from pivoting in the opposite direction away from the equilibrium position, thereby limiting overshooting.

10. The actuator of claim 9, wherein the pivot element of the input link is linearly adjustable such that the position of the pivot element can be adjusted along a length of the lever to adjust a stiffness of the actuator.

11. The actuator of claim 10, further comprising a motor that is configured to move the linear position of the pivot element.

12. The actuator of claim 9, wherein the pivot element further comprises a low-friction element configured to reduce friction between the input link and the lever of the output link.

13. The actuator of claim 9, wherein the U-shaped portion of the lever of the output link is semicircular.

14. The actuator of claim 9, wherein the output link further comprises a mechanical stop configured to limit an extent to which the lever can pivot about its pivot axis.

\* \* \* \* \*